Patented Sept. 8, 1925.

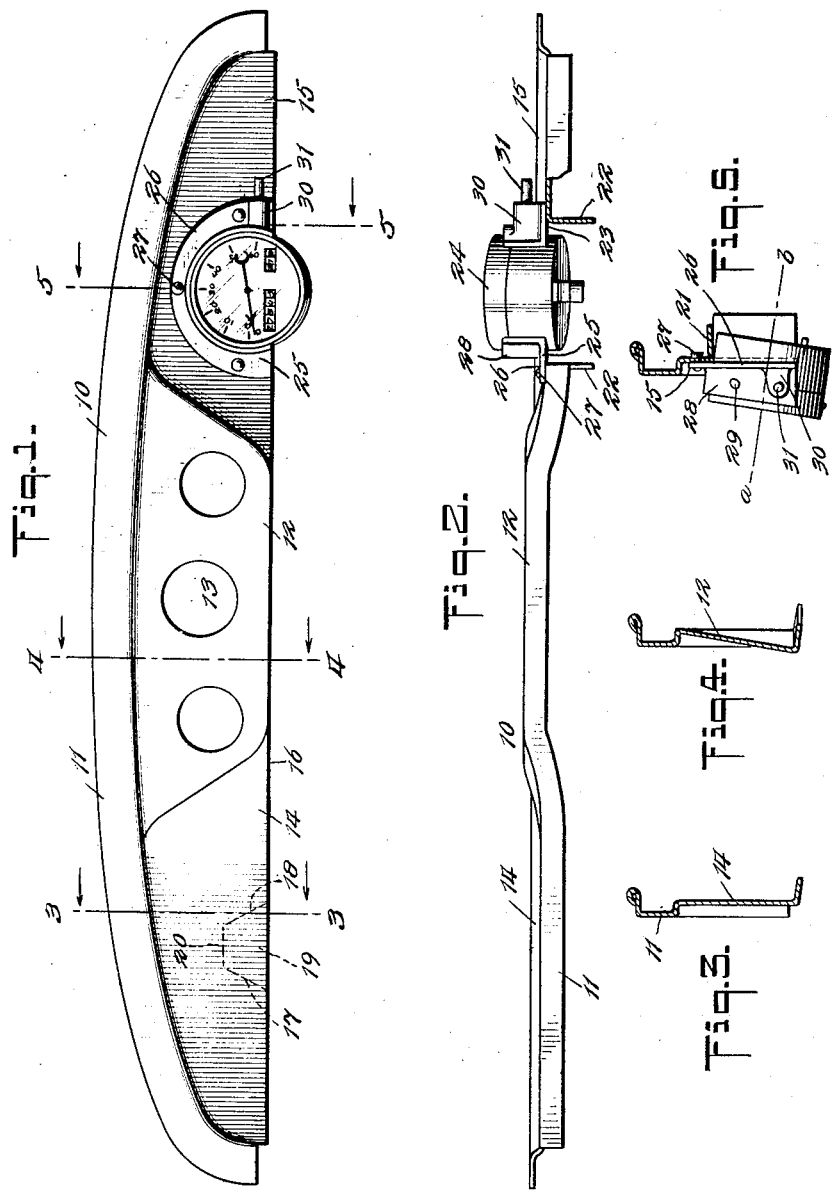

1,552,659

UNITED STATES PATENT OFFICE.

FRANK WILLIAM WEST, OF NEW ROCHELLE, NEW YORK, ASSIGNOR, BY MESNE ASSIGNMENTS, TO STEWART-WARNER SPEEDOMETER CORPORATION.

SPEEDOMETER MOUNTING.

Application filed March 8, 1923. Serial No. 623,819.

*To all whom it may concern:*

Be it known that I, FRANK WILLIAM WEST, a citizen of the United States, and resident of New Rochelle, in the county of Westchester and State of New York, have invented certain new and useful Improvements in Speedometer Mountings, of which the following is a specification.

The invention relates in general to an instrument mounting of general application, and specifically refers to a mounting for positioning an indicating instrument, such as a speedometer, on the instrument board of an automotive vehicle.

In certain makes of automobiles now in general use, the instrument board is vertically disposed or is inclined so as to dispose the metallic sheet forming the board in such a way that the front face is inclined downwardly and rearwardly, that is, in a direction projecting under the cowl and away from the operator occupying the driver's seat. It is a common practice in mounting instruments, such as speedometers, to provide an opening in the instrument board and to insert the speedometer which is usually of cylindrical form on position in the opening with the axis of the cylindrical instrument in line of vision of operator or approximately horizontally disposed. In this connection different forms of mounting rings are utilized to secure the instrument to the mounting board. It is obvious that any such mounting of an instrument on a rearwardly inclined board or even on a strictly vertical board would depress the front face of the instrument away from the line of vision of the operator.

Accordingly, the primary object of the present disclosure is to provide a simple form of mounting ring preferably an easily formed casting, for positioning an indicating instrument on a vertical or rearwardly inclined support and at the same time to adjust the face of the instrument so as to bring the same into the line of vision of a person's eye situated in advance of and above the level of the instrument.

Still featuring simplicity of construction, another object of the invention is to provide, particularly in connection with a sheet metal mounting board, a construction which can be easily mounted on the instrument board without necessity of any refined machine operation nor necessity for using skilled labor in the method of mounting the instrument in place.

In certain forms of speedometers now in general use, it is usual to provide a mileage counter resetting mechanism, the controlling shaft of which is required to be readily accessible for manual manipulation by the operator. Heretofore, it has been necessary to cut the instrument board in a definite and not infrequently difficult way in order to accommodate this re-setting shaft.

Further contributing to simplicity of construction, another object of the invention is to provide in connection with the mounting ring herein featured, a bearing for a readily accessible resetting shaft and which bearing may constitute a part of the casting forming the mounting ring and the installation of which mounting ring will require simply the cutting of the lower edge of the instrument board and the bending back of the material therebetween to form an opening to accommodate the instrument.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawing—

Figure 1 is a view in front elevation of a form of instrument board found on a well-known make of car and showing a speedometer mounted thereon by means constituting a preferred embodiment of the invention.

Figure 2 is an edge view looking upwardly from the underside of the disclosure shown in Figure 1.

Figures 3, 4 and 5 are each transverse sectional views taken respectively on the lines 3—3, 4—4 and 5—5 of Figure 1, looking in the direction indicated by the arrows.

Referring particularly to the showing in Figures 1 and 2, there is disclosed a sheet metal pressing 10 constituting an instrument board or dash-board of an automotive vehicle. In the particular design illustrated, there is disclosed an upper rim portion 11 outlining the top of the board and a downwardly and slightly forward extending central portion 12 provided with openings 13 for accommodating the vehicle instruments usually found on such mounting board. It will be noted from the showing in Figure 4 that the inclination of the part 12 is such as will tend to tilt the front faces of the instruments upwardly and in position so as to be readily seen by the operator.

On the contrary, the portions of the board at opposite sides of the central portion 12 are depressed to form recessed portions 14 and 15 designed to provide additional knee space for the persons occupying the front seat of the vehicle.

In the showing in Figure 3 it is noted that the depressed portions are vertically disposed but it is proposed in one make of car to incline the wall 14 downwardly and slightly rearwardly in the reverse direction from the showing in Figure 4, and in the following claims this latter definition is to be regarded as sufficiently inclusive to include a part 14 which is strictly vertical.

The instrument board as thus far described constitutes part of the standard equipment of certain cars and the present disclosure features means for mounting an indicating instrument, such as a speedometer, on the depressed portion of such an instrument board. It is required in practice that the instrument be mounted with the least possible distortion or mutilation of the instrument board and that the mounting be such as can be attained without necessity of removing the instrument board from the car or of necessitating the use of any particular type of tools or skilled labor.

In the present disclosure it is necessary simply to cut into the recessed portions 14 or 15 from the lower edge 16. As suggested in dotted outline at the left of Figure 1, the cut can be attained by means of a hack saw cutting back on the lines 17 and 18 and bending the material 19 therebetween upwardly and rearwardly on the line 20, thus forming a rearwardly extending flange indicated at 21 in Figure 5. Of course where a particularly neat effect is desired, the flange 21 may be cut off along the line 20 but this is not necessary where a saving in labor cost is vital.

In the construction suggested at the right of Figure 2, the material at the cut-out portion 19 may be bent out of the way laterally on each side of the opening 23 as indicated at 22. In either case, it will be understood that it is simply necessary to cut through the lower edge of the instrument board and bend the material out of the way of the instrument to be mounted in the opening formed by the cut-away portion. There is shown mounted in this opening a conventional form of speedometer 24 and which usually is of cylindrical outline.

The instrument is secured in place by means of a metal stamping or casting 25 constituting a mounting ring. This ring includes a flat mounting flange 26 substantially semicircular in elevation as shown in Figure 1 and secured to the front side of the depressed portion 15 by rivets or screws 27. An instrument engaging flange 28 projects forwardly and integrally from the flange 26, is substantially semicylindrical in outline and constitutes in effect a saddle fitting over the top of the instrument and encircling the same for about 200 degrees considered circumferential of the axis of the cylindrical instrument.

The axis a—b of the cylinder formed by the flange 28 extends at a slight angle to the plane of the flange 26, as shown in Figure 5, so as to tilt the front face of the instrument 24 upwardly to correspond somewhat to the disposition of the instruments carried by the openings 13 at the center of the mounting board. The flange 28 is secured to the instrument by means of rivets or screws 29.

In the showing in Figure 1 the lower edges of the flanges 26 and 28 terminate flush with the lower edge 16 of the instrument board which gives a neat appearance to the mounting ring, saves all material which would otherwise be used in underlapping the instrument, and at the same time provides a mounting which will accommodate a relatively large diametered instrument in the limited space provided vertically by the depressed portion of the instrument board. This arrangement permits the overhanging of the lower portion of the instrument below the lower edge of the instrument board.

In the particular showing of the mounting ring herein disclosed, there is included an integrally formed boss 30 projecting laterally from the lower right side of the flange 28 as shown in Figure 1, and projecting forwardly from the flange 26 as shown in Figure 2. The boss is somewhat massive and incidentally constitutes an angle bracing between the two flanges of the ring. This boss provides a bearing for the usual resetting shaft 31 commonly found on certain makes of speedometers now in general use and acts to space the finger engaging end of the shaft forwardly from the flange 26 a distance to permit the operator's fingers to clear the flange when rotating the shaft.

By means of a device such as herein disclosed, it is possible to provide the mounting ring in the form of a cheap, easily formed sheet metal plate or casting, and which will provide ample security of connection between the cylindrical instrument and the sheet metal instrument board and at the same time reinforce the board across the cutaway portion. The instruments can be easily secured in the ring by rivets, screws or any suitable and inexpensive form of securing means, and can be marketed completed with the mounting ring in proper position. In order to mount such a unit on an instrument board, it is necessary simply to saw a couple of cuts and bend back the material between the cuts to provide an opening of a size sufficient to accommodate the instrument. Even if this cut be crudely made, the finished appearance of the mounting ring will act to conceal any crude cut and present a neat appearance to the front of the mounting board.

Having thus described my invention, I claim:

1. In combination with an instrument having a substantially cylindrical casing and an instrument board having a part of its lower edge cut away to form an opening for the instrument, the instrument casing being disposed in said opening with its horizontal diameter above the line of the lower edge of the board but with a portion of said casing extending below said line, a mounting member snugly embracing the portion of said cylindrical casing above said line of the lower edge of the board and thereby engaging more than 180° of the cylinder circumference, together with means securing the mounting member to the board.

2. In the combination defined in claim 1, said mounting member including a transaxial flange extending outwardly from the portion which engages the instrument casing and overlying the face of the instrument board adjacent the upper part of the instrument and extending downwardly to the lower edge of the board but not beyond it to provide a finish for the opening which accommodates the instrument.

3. In combination with an instrument having a substantially cylindrical casing and an instrument board formed with an opening to accommodate said casing, a mounting member comprising a circularly formed flange dimensioned to fit the casing and a mounting flange adapted for securement to the board and extending outwardly from the first flange in a plane oblique to the axis thereof, whereby the instrument is supported with its axis inclined to the face of the board.

4. A single metallic member constituting an instrument mounting ring including a mounting flange, an instrument engaging flange projecting forwardly of the mounting flange and said instrument flange provided with a lateral extension constituting a boss provided with an opening adapted to form a bearing for a resetting shaft.

Signed at New York city in the county of New York and State of New York, February, A. D., 1923.

FRANK WILLIAM WEST.